(12) United States Patent
Hoffman et al.

(10) Patent No.: US 8,490,007 B1
(45) Date of Patent: Jul. 16, 2013

(54) METHOD AND APPARATUS FOR MOTIVATING INTERACTIONS BETWEEN USERS IN VIRTUAL WORLDS

(75) Inventors: Steven Samuel Hoffman, San Francisco, CA (US); Naomi Kokubo, San Francisco, CA (US)

(73) Assignee: Hyperlayers, Inc., San Francisco, CA (US)

( * ) Notice: Subject to any disclaimer, the term of this patent is extended or adjusted under 35 U.S.C. 154(b) by 636 days.

(21) Appl. No.: 12/129,519

(22) Filed: May 29, 2008

Related U.S. Application Data (60) Provisional application No. 60/940,955, filed on May 30, 2007, provisional application No. 60/941,250, filed on May 31, 2007, provisional application No. 60/941,258, filed on May 31, 2007, provisional application No. 60/941,261, filed on May 31, 2007, provisional application No. 60/955,137, filed on Aug. 10, 2007, provisional application No. 60/955,144, filed on Aug. 10, 2007, provisional application No. 60/974,438, filed on Sep. 21, 2007, provisional application No. 61/034,451, filed on Mar. 6, 2008.

(51) Int. Cl.
  *G06F 3/048* (2006.01)
(52) U.S. Cl.
  USPC .......................... 715/772; 715/757; 715/850
(58) Field of Classification Search
  USPC ........................................ 715/757, 850, 772
  See application file for complete search history.

(56) References Cited

U.S. PATENT DOCUMENTS

| | | | |
|---|---|---|---|
| 6,106,395 A | 8/2000 | Begis | |
| 6,268,872 B1 | 7/2001 | Matsuda et al. | |
| 6,314,475 B1 | 11/2001 | Collin et al. | |
| 6,612,932 B2 | 9/2003 | Stern | |
| 6,618,593 B1* | 9/2003 | Drutman et al. | 455/456.3 |
| 6,729,884 B1 | 5/2004 | Kelton et al. | |
| 6,746,332 B1 | 6/2004 | Ing et al. | |
| 6,749,511 B2 | 6/2004 | Day | |
| 6,847,940 B1 | 1/2005 | Shelton et al. | |
| 7,249,139 B2 | 7/2007 | Chuah et al. | |
| 7,412,422 B2 | 8/2008 | Shiloh | |
| 7,433,834 B2* | 10/2008 | Joao | 705/22 |
| 7,455,586 B2 | 11/2008 | Nguyen et al. | |
| 7,480,727 B2 | 1/2009 | Domschitz | |
| 7,529,797 B2 | 5/2009 | Tseng et al. | |
| 7,901,288 B2 | 3/2011 | Barsness et al. | |
| 7,925,703 B2 | 4/2011 | Dinan et al. | |
| 8,002,617 B1 | 8/2011 | Uskela et al. | |

(Continued)

*Primary Examiner* — Ryan Pitaro
(74) *Attorney, Agent, or Firm* — Pillsbury Winthrop Shaw Pittman LLP (57) ABSTRACT

The present invention relates generally to the field of computer and network software, and more particularly it relates to a method and apparatus for promoting and facilitating interactions between users in virtual worlds. According to some aspects, the invention provides a way of allowing a user to easily identify other users that the user may want to connect with for any purpose. According to other aspects, the invention allows users to specify items, interests, friends, demographics and/or preferences, and the system automatically identifies other users who meet those criteria. The system can further provide mechanisms to alert and/or introduce users who share similar interests, demographics and/or meet other matching criteria, and allow them to interact with each other. According to still further aspects, the invention can automatically determine criteria for motivating and/or facilitating interactions between users. According to still further aspects, the invention can motivate and/or facilitate interactions between users while they are casually surfing the web, as opposed to visiting a special web site or specific network location.

16 Claims, 11 Drawing Sheets

U.S. PATENT DOCUMENTS

| | | |
|---|---|---|
| 8,105,153 B2 | 1/2012 | Buecheler et al. |
| 2002/0013174 A1 | 1/2002 | Murata |
| 2002/0052925 A1 | 5/2002 | Kim et al. |
| 2002/0065136 A1 | 5/2002 | Day |
| 2002/0065826 A1 | 5/2002 | Bell et al. |
| 2002/0068631 A1 | 6/2002 | Raverdy et al. |
| 2002/0094870 A1 | 7/2002 | Murray |
| 2002/0099818 A1 | 7/2002 | Russell et al. |
| 2002/0120501 A1 | 8/2002 | Bell et al. |
| 2003/0014423 A1 | 1/2003 | Chuah et al. |
| 2003/0156135 A1 | 8/2003 | Lucarelli |
| 2003/0191816 A1 | 10/2003 | Landress et al. |
| 2004/0058694 A1* | 3/2004 | Mendiola et al. .............. 455/466 |
| 2004/0122895 A1* | 6/2004 | Gourraud ..................... 709/204 |
| 2005/0086605 A1 | 4/2005 | Ferrer et al. |
| 2005/0137015 A1 | 6/2005 | Rogers et al. |
| 2005/0174975 A1* | 8/2005 | Mgrdechian et al. ......... 370/338 |
| 2006/0183551 A1 | 8/2006 | Prudent |
| 2006/0282426 A1* | 12/2006 | Spears ............................... 707/5 |
| 2006/0282530 A1 | 12/2006 | Klein et al. |
| 2007/0030824 A1* | 2/2007 | Ribaudo et al. ............... 370/328 |
| 2007/0037574 A1* | 2/2007 | Libov et al. ................. 455/435.2 |
| 2007/0043583 A1 | 2/2007 | Davulcu et al. |
| 2007/0043646 A1* | 2/2007 | Morris ............................ 705/37 |
| 2007/0067441 A1 | 3/2007 | Pomerantz |
| 2007/0078962 A1 | 4/2007 | Donnelli et al. |
| 2007/0150537 A1 | 6/2007 | Graham |
| 2007/0150603 A1 | 6/2007 | Crull et al. |
| 2007/0203828 A1 | 8/2007 | Jung et al. |
| 2007/0225070 A1 | 9/2007 | Zahorik et al. |
| 2007/0294351 A1 | 12/2007 | El-Emam |
| 2008/0046363 A1 | 2/2008 | Ali et al. |
| 2008/0046458 A1 | 2/2008 | Tseng et al. |
| 2008/0059575 A1 | 3/2008 | Malobrodsky et al. |
| 2008/0097851 A1 | 4/2008 | Bemmel et al. |
| 2008/0097871 A1 | 4/2008 | Williams et al. |
| 2008/0102947 A1 | 5/2008 | Hays et al. |
| 2008/0104496 A1 | 5/2008 | Williams et al. |
| 2008/0140650 A1* | 6/2008 | Stackpole ........................ 707/5 |
| 2008/0160877 A1* | 7/2008 | Lipman ........................ 446/268 |
| 2008/0215975 A1 | 9/2008 | Harrison et al. |
| 2008/0215995 A1* | 9/2008 | Wolf ............................. 715/758 |
| 2008/0262910 A1 | 10/2008 | Altberg et al. |
| 2008/0262911 A1 | 10/2008 | Altberg et al. |
| 2009/0152349 A1 | 6/2009 | Bonev et al. |
| 2009/0198666 A1* | 8/2009 | Winston et al. ................... 707/5 |
| 2009/0241035 A1 | 9/2009 | Tseng et al. |
| 2009/0254459 A1 | 10/2009 | Williams et al. |
| 2009/0271212 A1* | 10/2009 | Savjani et al. ..................... 705/1 |
| 2011/0282646 A1 | 11/2011 | Bill |
| 2012/0015668 A1* | 1/2012 | Mgrdechian et al. ...... 455/456.1 |

* cited by examiner

METHOD AND APPARATUS FOR MOTIVATING INTERACTIONS BETWEEN USERS IN VIRTUAL WORLDS

CROSS-REFERENCE TO RELATED APPLICATIONS

The present application claims priority to U.S. Provisional Appln. No. 60/940,955 filed May 30, 2007, U.S. Provisional Appln. Nos. 60/941,250, 60/941,258 and 60/941,261, all filed May 31, 2007, U.S. Provisional Appln. Nos. 60/955,137 and 60/955,144 filed Aug. 10, 2007, U.S. Provisional Appln. No. 60/974,438, filed Sep. 21, 2007, and U.S. Provisional Appln. No. 61/034,451 filed Mar. 6, 2008, the contents of which are all incorporated by reference herein in their entirety.

FIELD OF THE INVENTION

The present invention relates to computer and network software, and more particularly it relates to a method and apparatus for promoting, motivating and facilitating user interactions in, or in connection with, virtual worlds.

BACKGROUND OF THE RELATED ART

There has been a recent surge in "virtual world" technologies that allow users to assume virtual identities (e.g avatars) and possibly also to interact with other users online, such as Second Life, Habbo, Zwinky, Gaia, Club Penguin, Webkinz. These are typically accessed via dedicated websites and subscriptions, and are typically closed systems (i.e. a user in one virtual community cannot directly interact with users in other virtual communities). These online communities sometimes further offer virtual items that can be bought and sold within their virtual worlds, such as virtual furniture, virtual clothing, virtual real estate, etc.

One problem with existing "virtual world" products is that they typically require users to go to specific online destinations to assume virtual identities and to acquire and use virtual items rather than allowing users to assume virtual identities and/or pick up and use virtual items while browsing any website on the Internet. Accordingly, it would be desirable if a system was provided in which users could interact with other users using virtual identities and/or obtain and use virtual objects and virtual goods while they surf anywhere on the worldwide web.

Meanwhile, there has also been a surge in popularity of many other non-virtual social networking applications such as MySpace, Facebook, etc., as well as many dating sites, such as eHarmony.com, Match.com, etc. These applications also generally require users to go to a specific site in order to interact, and do not allow interactions between users while they are otherwise casually surfing the web.

Co-pending U.S. application Ser. No. 12/037,019, commonly owned by the present assignee, dramatically advanced the state of the art by providing a method and apparatus for distributing virtual objects such as Virtual Collectibles. According to an aspect of the co-pending application, the system automatically allows users to enter virtual world(s) that span across the world wide web where Virtual Collectibles can be displayed, used, and traded, and where users can interact with other users. Although this functionality by itself vastly improves upon conventional means of promoting on-line activities, additional improvements are possible by further leveraging the discoveries and functionalities of the co-pending application, including improvements that even further overcome the above-described and other disadvantages.

For example, while the virtual world(s) of the co-pending application allows users to interact with Virtual Collectibles and/or other users in entertaining ways, it would be desirable if the principles of the invention of the co-pending application could be extended to allow for even more advanced forms of interactions between users, and easier ways for users to determine whether they share some common interest or needs, which would thereby encourage such users to interact even further and further enhance their online experience.

SUMMARY OF THE INVENTION

The present invention relates generally to the field of computer and network software, and more particularly it relates to a method and apparatus for promoting and facilitating interactions between users in virtual worlds. According to some aspects, the invention provides a way of allowing a user to easily identify other users that the user may want to connect with for any purpose. According to other aspects, the invention allows users to specify items, interests, friends and/or demographics, and the system automatically identifies other users who meet those criteria. The system can further provide mechanisms to alert and/or introduce users who share similar interests or demographics or who match specified criteria, and allow them to interact with each other. According to still further aspects, the invention can automatically determine criteria for motivating and/or facilitating interactions between users. According to still further aspects, the invention can motivate and/or facilitate interactions between users while they are casually surfing the web, as opposed to visiting a special web site or specific network location.

In furtherance of these and other aspects, a method according to an embodiment of the invention includes identifying criteria that causes a first user to be motivated to interact with a second user, and automatically alerting the first user about the second user when the first and second user are in first and second virtual locations on a network and communicating with a common server system. A method according to other embodiments of the invention includes receiving information, at a server system, that first and second users are simultaneously accessing first and second publicly accessible website addresses, wherein the server system is remotely located from the publicly accessible website addresses, and serving content from the server system to a client associated with the first user that indicates the presence of the second user, wherein other users that access the first publicly accessible website address and are not configured with the client do not receive the content served by the server system.

DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
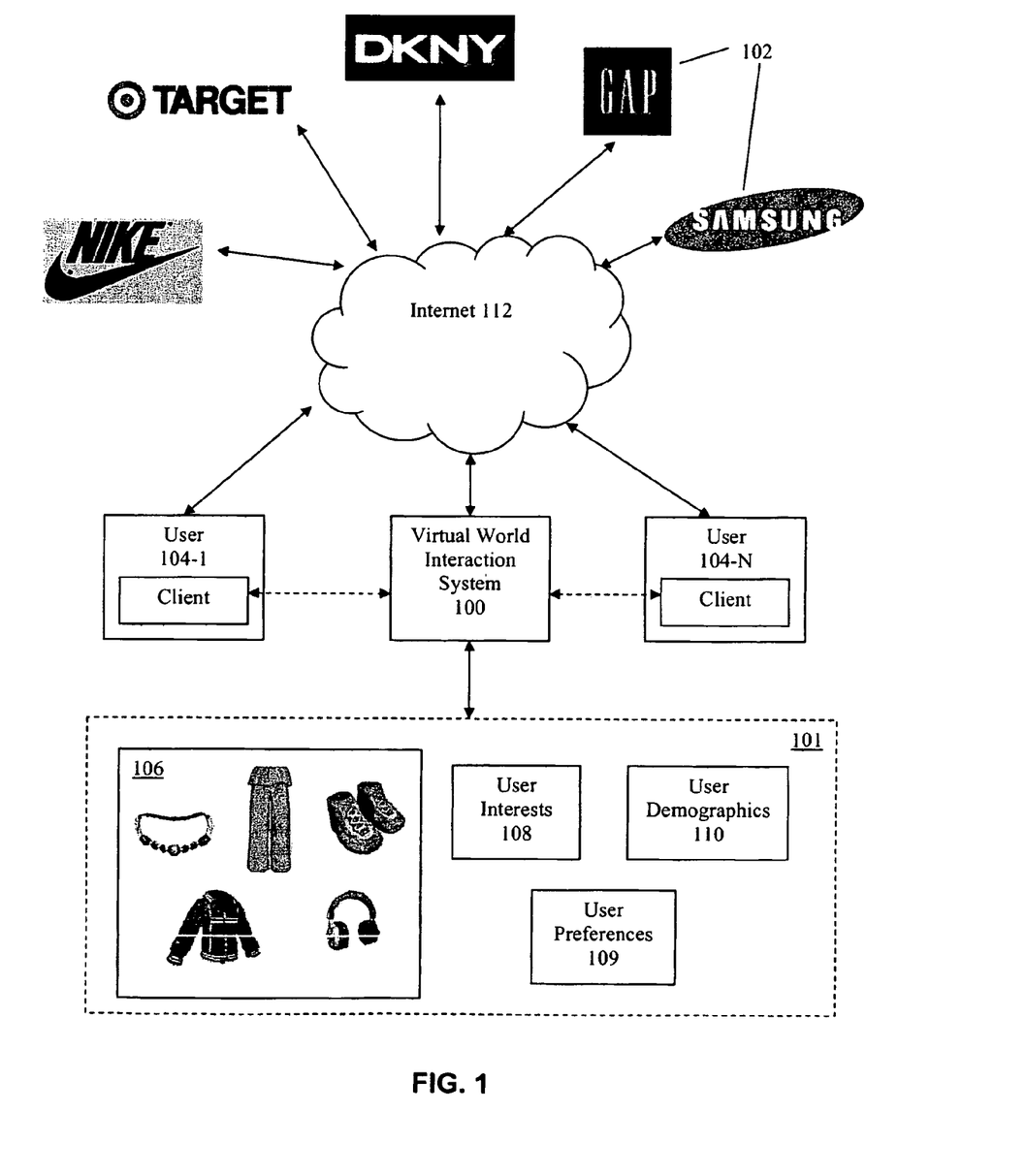
FIG. 1 is a block diagram illustrating the basic concepts of a virtual world motivated interaction system and method according to the invention.

As generally shown in FIG. 1, the present invention can be embodied in a system 100 that facilitates and/or motivates interactions between users 104 while they are casually surfing the Internet 112, including visiting sites of advertisers and other companies or organizations 102. In particular, and as will be explained more fully below, system 100 provides mechanisms that introduce users 104 to each other based on user information 101, which can include their need or interest in certain types of virtual goods 106 (e.g. Virtual Collectibles), their interests 108, preferences 109 and/or their demographics 110. Typically, system 100 automatically introduces users 104 to each other using communications with user clients while the users 104 are simultaneously visiting the same virtual location or virtual world (e.g. a virtual space associated with websites 102) and/or are simultaneously on-line but in different virtual locations. Additionally or alternatively, users can search for other users who have desired goods 106, similar interests 108, match preferences 109 and/or demographics 110, among other criteria, including without limitation a user's list of friends.

According to some aspects, the present invention leverages and expands on the discoveries and functionalities of the above-mentioned co-pending application Ser. No. 12/037,018. For example, the co-pending application provides an interactive system that distributes virtual objects (i.e. Virtual Collectibles) to users while they are casually surfing the web. Each Virtual Collectible consists of one or more attributes. Attributes may determine the virtual object's appearance, behavior, value, virtual location, ownership, etc. Virtual Collectibles are virtual objects that are potentially unique. According to other aspects, the co-pending application further provides mechanisms to allow users to interact with each other in virtual spaces, such as personal chat rooms or chat rooms associated with partner sites.

Returning to FIG. 1, system 100 communicates with users 104-1 to 104-N having clients and associated hosts via Internet 112 to facilitate and/or initiate interactions between them according to aspects of the invention. In embodiments, system 100 can also communicate with hosts that do not have clients (not shown).

System 100 can be implemented by one or more server computers and associated operating system(s), web server(s), database server(s), and other server and application software such as the servers, software and systems described in any or all of co-pending application Ser. Nos. 12/037,019 filed Feb. 25, 2008, 12/118,533 filed May 9, 2008, 12/126,255 filed May 23, 2008, 12/111,916 filed Apr. 29, 2008 and 12/106,925 filed Apr. 21, 2008, all incorporated herein by reference in their entirety, as adapted with the motivated user interaction functionality as will be described in detail herein. According to aspects of the invention, such functionality facilitates motivated interactions between users 104 having clients that communicate with system 100. For example, system 100 allows, or perhaps initiates, users 104 having clients to interact with each other (for example to chat, share interests and/or virtual goods 106 and/or become friends) based on their virtual location(s) associated with websites 102 (e.g. www.ford.com, www.coke.com, etc.) that are accessible via Internet 112 by conventional web browsers, for example. It should be apparent that users 104 can also interact with each other in other ways apart from virtual locations.

In general operation, system 100 provides a simple way of identifying other users that a particular user may want to connect with for any purpose. In embodiments, system 100 communicates with a user 104's client application that either resides within a browser plug-in or is active on the same computing device while user 104 is browsing the web. Preferably, as described in the co-pending applications, the client plugs into the browser and/or resides on the desktop, taskbar or a visible portion of the screen of the computing device. According to aspects of the invention, system 100 communicates with the client to alert users 104 to changes in the status of the system and/or presence of other users who have desired goods 106, have similar interests 108, match criteria in preferences 109 and/or have similar demographics 110. These alerts can be visual, text and/or audio, so that the user is instantly aware of the status of the software application while browsing the web. There can be numerous types of status alerts. These can include, but are not limited to: (i) alerts regarding the presence of any virtual items a user needs. In other words, whenever a virtual item is available for the user to trade or pick up, the user will receive an alert; (ii) alerts regarding friends who are currently on-line with the system 100; (iii) alerts regarding messages that the user has received; (iv) alerts regarding other users who are currently visiting the website or webpage that the user is on; (v) alerts regarding other users who are currently visiting the chat room or virtual space associated with the website or webpage the user is on; (vi) alerts regarding other users who are currently visiting a parallel destination (as described in more detail in the co-pending applications) associated with the website or webpage the user is on; and (vii) alerts regarding users on the website or in the virtual space that meet a user 104's specific criteria (e.g. desired Virtual Collectibles 106, interests 108, preferences 109 and/or demographics 110, etc.).

It should be noted that alerts as described above can be generated based on users 104 in the same virtual location or virtual space. However, this is not necessary. For example, User A might want to meet someone with specific criteria, and User B meets the criteria. User A might be online, doing whatever activity he/she is engaged in, while User B is off line. Eventually, while User A is still online, User B comes online (no matter what virtual location User B might be logged into). At that point, User A could be notified, and may even have an option to send a message directly to User B, even if User A is not in the same virtual location as User B. By contacting as such, they can arrange to meet up somewhere, or simply start chatting one-on-one, etc.

In embodiments such as that shown in FIG. 1, user information 101 maintained by system 100 is a user accounts database that includes lists, typically for each individual user of the system, of Virtual Collectibles 106, user interests 108, user preferences 109, and user demographics 110. It should be noted that system 100 can maintain other conventional user account information as part of, or separately from information 101, such as usernames, passwords, contact information, etc., in such a database or other locally or remotely accessible storages. Moreover, embodiments of the invention can include only one or some of the information in 106, 108, 109 and 110.

Virtual Collectibles 106 includes items belonging to individual users, and/or credits, points or other real or virtual currency associated with the users that can be redeemed or exchanged for Virtual Collectibles, for example. As described in more detail in the co-pending applications, Virtual Collectibles 106 (including or in addition to other virtual world objects such as planets, backgrounds, etc.) are maintained by system 100 as one or more objects that may contain animations, sound, graphics and specific functionality within a game or rules-based system. Virtual Collectibles can be as simple as graphics files. For example, a Virtual Collectible could be a .GIF, .JPG, .BMP or .PNG file corresponding to a static image when rendered on a host computer. Virtual Collectibles can further or alternatively include an animation file, such as an animated .GIF file or a Flash animation. Virtual Collectibles can also further or alternatively include any sort of media file, including any type of audio or movie file, such as MP3, .AVI, .SWF, .MPG, WMV, .WAV, etc. In such cases, content associated with Virtual Collectibles can typically be downloaded or streamed to users 104 via clients and conventional protocols such as http and rendered on hosts using conventional browser functionality and/or functionality in optional multimedia players such as Flash.

It should be noted that Virtual Collectibles can be as sophisticated as a programmable bot or application, such as a trivia game, mini-game, interactive pet, or bot endowed with artificial intelligence. In this case, the Virtual Collectibles may come with a client-server architecture of their own, or they may plug into the client-server framework of a larger game or application provided by system 100 and/or downloaded to user 104 clients. For example, the Virtual Collectible could include a Flash game or a Java game, or a Java servlet, or a C++ game, or an Active X control, etc.

Returning to FIG. 1, user information 101 maintained by system 100 further includes user interests 108, user preferences 109 and user demographics 110. User interests 108 can include things the user needs or wants, whether that be information, a virtual item, or something that they want to exchange. User interests 108 can also include goals, music/movie/TV preferences, hobbies, etc. User interests 108 can also or alternatively include activities or games the user wants to participate in, such as an on-line game of virtual hockey hosted by system 100. User demographics 110 can include age, location, gender, relationship status, occupation, etc. User preferences 109 can include similar information as is included in interests 108 and/or demographics 109, but relates not to the individual user him/herself, but to criteria of other users the individual user would like to meet. For example, even if a user's own demographics 110 indicate he/she isn't from California, he/she may want to meet someone from California, and thus, set the preference as such. Also, the user may be looking for someone with a specific professional knowledge. The user may not be a computer graphics person but may be interested in meeting someone who is skilled in using graphics tools, etc. Other examples and alternatives should be apparent to those skilled in the art after being taught by these examples.

It should be noted that user information 101 can also include social networking information such as each user 104's list of friends within the system, preferences for displaying on on-line presence, etc. Moreover, for each type of information maintained by system 100, system 100 further preferably includes functionality for allowing users 104 to enter, change and view the information. For example, system 100 can include web pages, controls and scripts that can be selected by users 104 via web browsers and/or client applications and which allow the user to access information 101 for viewing or editing. Those skilled in the art will recognize various conventional mechanisms that can be used to implement this functionality, as will become more apparent from the above and following descriptions.

As further shown in FIG. 1, users 104 have hosts that can be any type of computing device a person can now or in the future use to access the Internet 112 or other public network, and which can host at least a client application as described in the co-pending applications and conventional or future Internet access hardware (not shown) and software such as a web browser. For example, the user's 104 host can be implemented by a personal computer such as a Mac, PC, notebook or desktop computer, which typically includes an operating system such as Windows or Mac OS, a browser application such as Windows Explorer or Mozilla Firefox, and network access hardware such as a wired or wireless modem. User 104 hosts further preferably include graphical displays (e.g. one or more LCD screens) and I/O devices (e.g. keyboard, mouse, keypad, scroll wheels, microphone, speakers, video or still camera, etc.) for providing a user interface within the operating system and communicating with the client application. User hosts are not limited to personal computers, but can include cellular phones, personal digital assistants (PDAs), game systems (e.g. Playstation, Wii, Xbox, etc.) or other devices, and those skilled in the art will understand how implementation details can be changed based on the particular type of host device.

As described in more detail in the co-pending applications, users' 104 clients are software applications that reside on the hosts and typically execute under the host operating system. The client software application can be either a standalone application, such as a user interface that occupies a large portion of the computer screen when in use, a plug-in that is embedded into another application such as a web browser and occupies very little screen space or overlays rendered content on top of other web browser content, or combination thereof and/or any other type of application and/or screen configuration.

In general operation described in more detail in the co-pending applications, the client application monitors the user's on-line behavior, such as the URLs that the user is visiting via conventional web browsers while casually surfing the web. It transparently sends this user activity information over the Internet to system 100. In the co-pending applications, the sent user activity information can be used for many purposes that enhance or alter the user's on-line experience, such as determining whether to provide virtual goods, services, games, parallel destinations, alerts, etc. to the user. System 100 of the present invention can perform some or all of this functionality, and can further use the user activity and information for motivated interaction functionality that will be described in more detail above and below.

The client application also preferably provides a graphical interface using the display and I/O devices of the host by which the user 104 navigates through, and interacts with other users in, virtual world(s) maintained and hosted by the system 100. For example, as described in more detail in the co-pending applications and below, system 100 can automatically form chat groups based on the users 104 that are currently visiting the same site, such as websites 102. System 100 can further automatically cause avatars associated with such users 104 to be displayed either overlaid on top of the regular website content or in parallel virtual worlds associated with the website. System 100 can allow such users 104 to chat with each other and concurrently cause their chat messages to be displayed.

Moreover, as described in more detail below and in the co-pending applications, the user may initiate an event requiring server attention, such as a trade request, from the interface. The user may also interact with other users using chat and other conventional and new online communication mechanisms, including but not limited to voice and video communications, hosted by system 100 and within or without the graphical interface provided by the client application. In embodiments, the graphical interface provides a graphical representation of other users in the form of avatars, and can also display the Virtual Collectibles that the user or other users own, either alone or together with their respective avatars.

Internet 112 is, for example, the public Internet, but can further or alternatively include any combination of wired and wireless networks, public and private, that are traversed by users who seek access to content on the public Internet, as will be appreciated by those skilled in the art. As should be further understood, websites 102 are publicly accessible via Internet 112 and the World Wide Web and protocols such as IP and http, and are hosted by web servers, servers and databases as understood by those skilled in the art.

It should be noted that the block diagram in FIG. 1 is intended to be illustrative and not limiting, and those skilled in the art will appreciate various alternative configurations, topologies, etc. For example, while only one system 100 is shown, there may be many servers, either in the same location and/or at the same network address, and/or distributed across many locations and/or network addresses. Moreover, system 100, websites 102 and other sites, and user 104 hosts are typically all remotely located from each other, both physically and with respect to different network addresses such as IP addresses. Many other alternatives are possible, as will become apparent to those skilled in the art.

Figure 2:
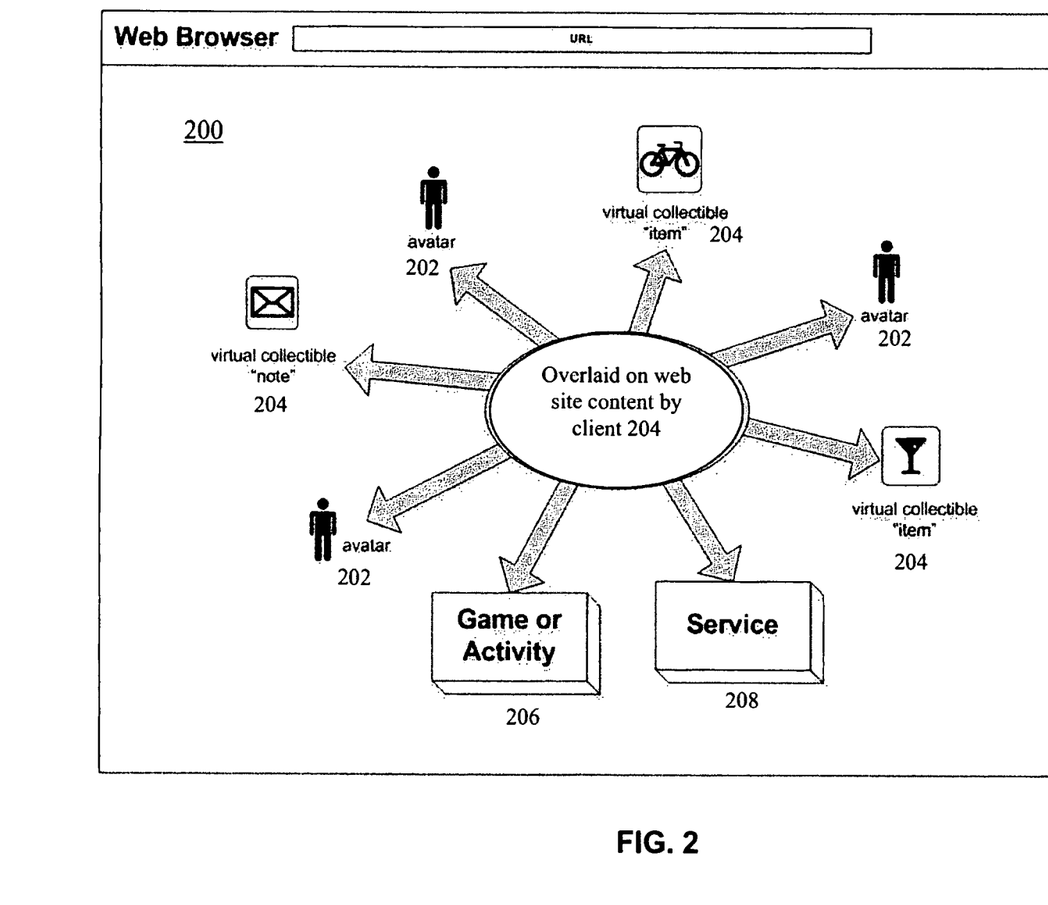
FIGS. 2 and 3 are representations of screen shots illustrating how virtual location-based goods and services can be provided using embedded/overlaid content or parallel destinations, respectively.

Certain broad aspects of how system 100 can allow users to interact with each other while casually surfing the web according to embodiments of the invention are illustrated in FIG. 2. As shown in FIG. 2, some embodiments of system 100 allow virtual objects and services to be overlaid on website content (e.g. web page) 200 of websites 102 that is ordinarily rendered for display by a web browser. These virtual objects can include avatars 202, virtual collectibles 204, games or activities 206 and on-line services 208. The mechanisms for displaying such objects and providing such services are described in the co-pending applications.

Virtual Collectibles 204 can include those described above and in detail in the co-pending applications, such as graphical objects (e.g. avatar clothing and attributes, accessories, virtual furniture, etc.), animations (e.g. barking dog, flying spaceship, etc.), games and other interactive objects.

Avatars 202 are typically personalized by each user, and in some respects can be considered Virtual Collectibles themselves. As described in the co-pending applications and further herein, avatars 202 can be associated with users of the system, and can denote an on-line presence of such users. It should be noted, however, that avatars 202 can also be associated with personnel of partner sites 102 or controlled by the system using scripts and/or artificial intelligence. As such they can interact with users of the system to provide support, direct users to specific pages of interest, inform users about special promotions, act as a host who conducts games and events, etc. The avatars 202 can also be a game object that users can play with and interact with.

Games or activities 206 can include puzzles, mazes, multimedia interactions between users' avatars (e.g. sword fights, tossing a ball, firing weapons and dodging fire, etc.), trivia games, arcade games, word games, social games, games of chance, games of skill, interactive toys and objects, virtual environment games, turn-based games, real-time games, message-based games, web-browsing games, etc. Some aspects of games and activities that can be provided in embodiments of the invention are described in more detail in co-pending application Ser. No. 12/111,916.

On-line services 208 can include bulletin boards, voice chat, blogs, classifieds, e-commerce, messaging, games, advertising, file sharing, financial services, mobile services, photos, music, radio, live broadcasts, news and information, job matchmaking, online dating, social networking, search, retail, consulting services, etc. Certain aspects of on-line services that can be provided in embodiments of the invention are described in more detail in co-pending application Ser. No. 12/118,533.

Figure 3:
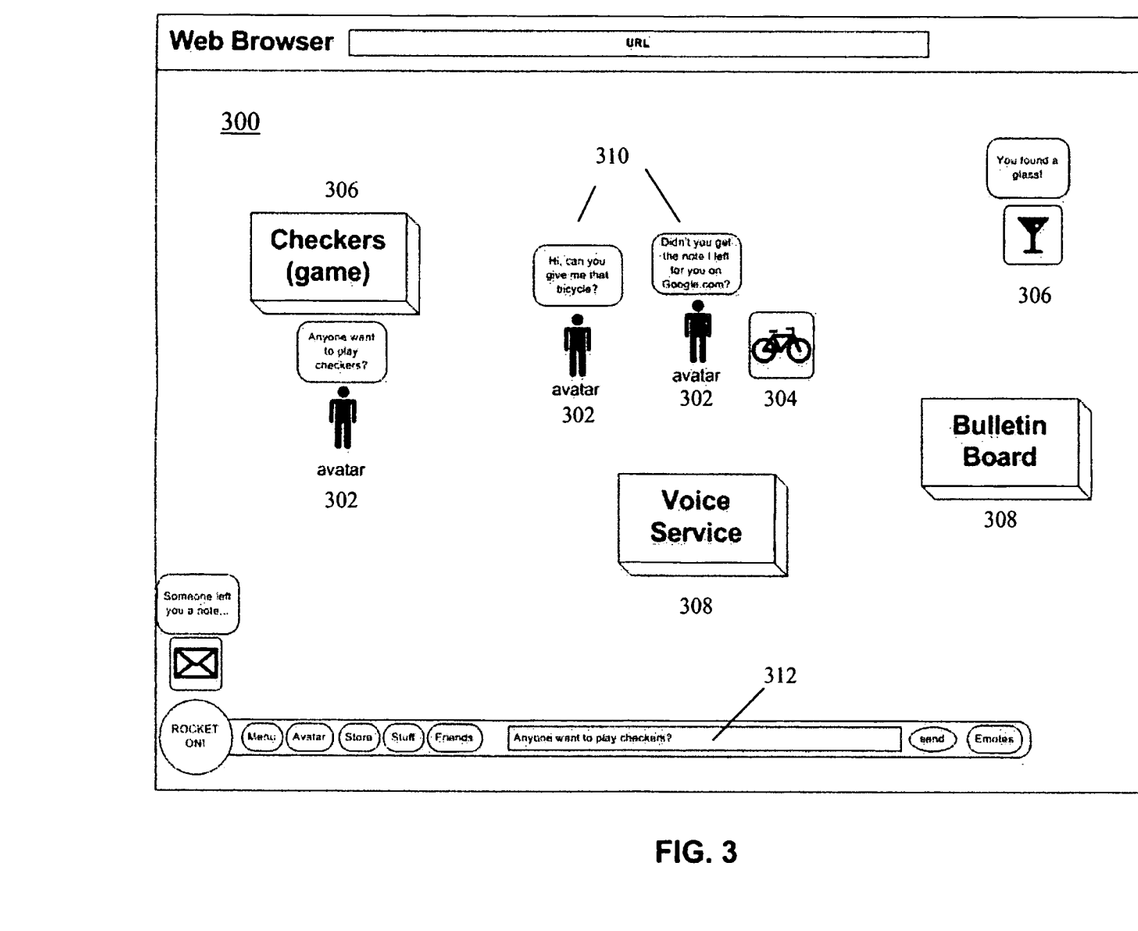

Certain alternative or additional aspects of system 100 according to embodiments of the invention are illustrated in FIG. 3. As shown in FIG. 3, some embodiments of the invention provide parallel destinations 300 that can be automatically accessed by users 104 with clients when they visit websites 102. Accordingly, rather than overlaying or embedding virtual goods and/or on-line services together with normal website content, web page 300 having this parallel destination content completely fills the screen and replaces normal web site 102 content, or is provided in a separate browser window, for example. Within this parallel destination, virtual objects can be provided, including avatars 302, virtual collectibles 304, games or activities 306 and on-line services 308, as described above. Moreover, user interactions, such as chat messages 310 that are entered by users 104 having clients in text box 312, are displayed by system 100 adjacent to their respective avatars 302. It should be noted that parallel destinations as provided in web page 300 can also include displays of some or all of the content typically provided in websites.

Figure 4:
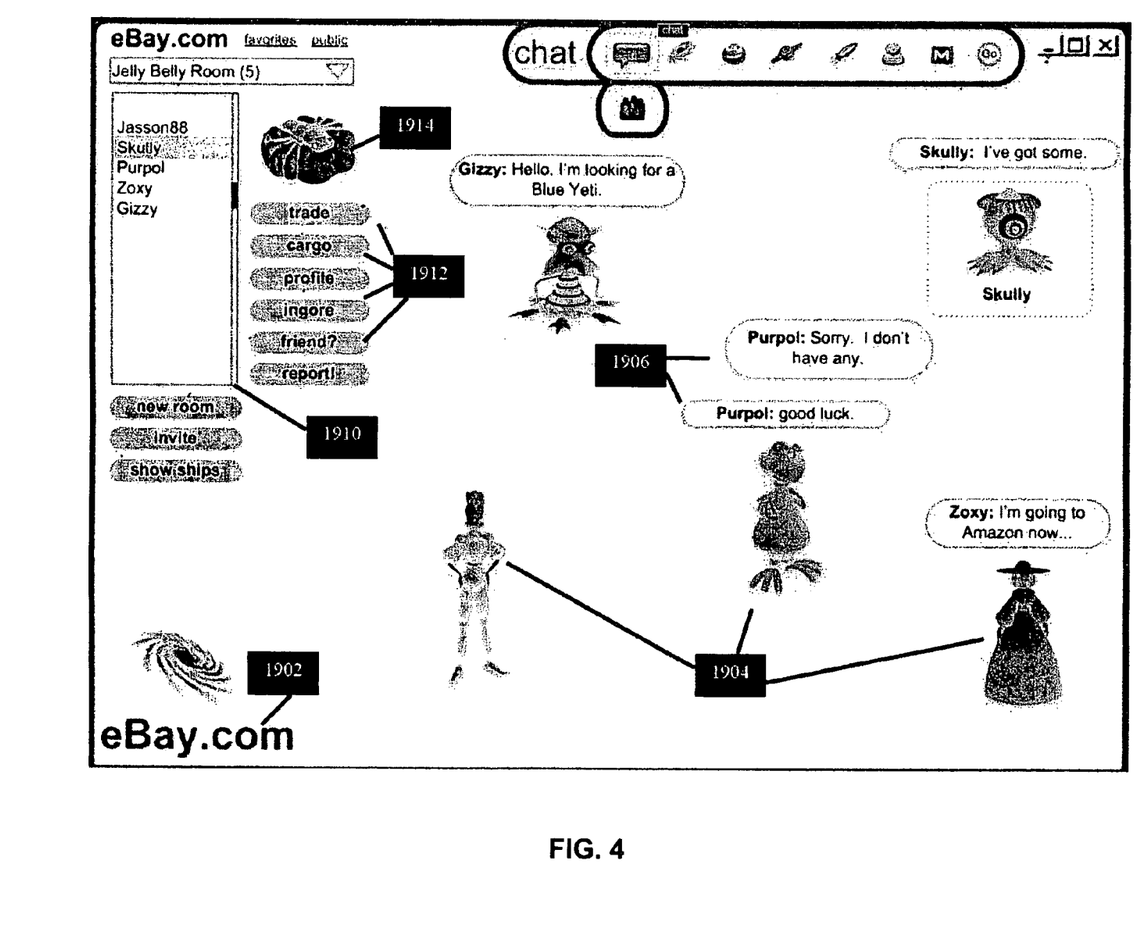
FIG. 4 is a screenshot illustrating how users can interact in virtual worlds hosted by a system according to embodiments of the invention.

FIG. 4 is a screenshot illustrating an example of how embodiments of system 100 can allow users to interact in virtual worlds hosted by the system 100 using chat mechanisms described in the co-pending applications, for example. As shown in FIG. 4, the system 100 can provide a chat room that is included as a parallel destination associated with a partner 102 website 1902. Alternatively or additionally, the website can be represented by a web master (either real or virtual) who has a personalized avatar, spaceship and home planet, similar to other users. Moreover, the chat room associated with the website may have a transparent background, and so the users may see their chatting avatars on top of the web page(s) of the web site that the users are browsing.

As shown in FIG. 4, system 100 represents users 104 in the website chat room by their respective avatars 1904, and their last entered chat message(s) 1906 can be displayed adjacent to their avatars, along with their usernames. Moreover, in this particular embodiment, the list of users participating in the chat room is shown in box 1910, and any user can interact or view information about other users via buttons 1912 that are displayed beneath the user's spaceship 1914. In FIG. 4, for example, a user selected Skully in 1910, which triggered the system/client to display Skully's spaceship in 1914. If the user selects another user in 1910, such other user's spaceship would appear in 1914.

Example implementations of certain aspects of the motivated interaction functionalities provided in accordance with embodiments of the present invention will become apparent from the above descriptions in conjunction with the following FIGS. 5 to 10. In general, FIGS. 5 to 10 are screenshot representations illustrating web page and other content served and displayed by system 100 based upon information, preferences and selections by users 104, as described in more detail below and in the co-pending applications. Details necessary for an understanding of the present invention will be provided below, while other details provided in the co-pending applications or otherwise apparent to those skilled in the art will be omitted for clarity of the invention. Moreover, those skilled in the art will understand how to implement mechanisms for allowing system 100 to communicate with user 104 clients to provide the functionality reflected in the screen shots based on the below descriptions as well as those in the co-pending applications.

Figure 5:
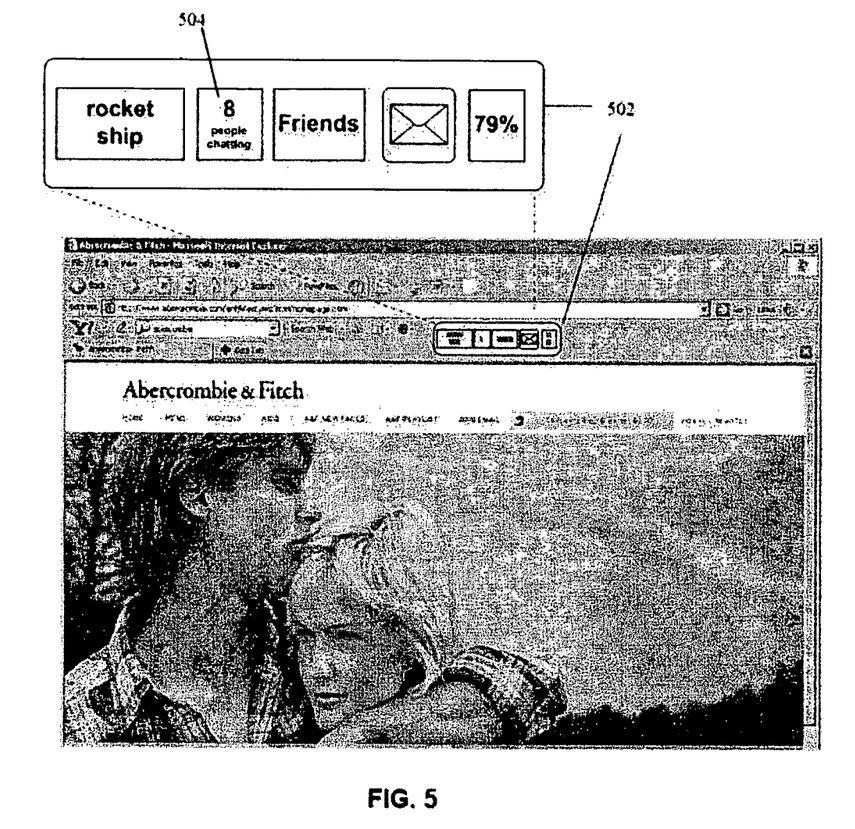
FIGS. 5 to 10 are screenshots illustrating various aspects of identifying and interacting with other users who share items, interests and/or demographics in accordance with embodiments of the invention.

FIG. 5 shows one example implementation of the invention using a browser plug-in as the client application as discussed above in connection with FIG. 1. As shown in FIG. 5, when installed on the host computer of user 104, the plug-in displays an icon tray 502 in the browser toolbar. In the upper right-hand corner is number display 504 including the number "8". This number shows the number of users 104 who are currently visiting the same website (e.g. abercrombie.com in this example) at this moment in time. In embodiments, the number is usually the color gray. However, when one of those users has something the user needs or wants, or matches the user's criteria (e.g. interests, demographics, preferences, etc.) the number changes from gray to green. This is one example implementation of how the invention provides motivation for interacting with other users online. It is letting the user 104 know that someone on abercrombie.com has something the user needs according to their information 101 and/or interests, preferences or demographics maintained by the system.

In one possible example, the colored number indicates that one of the users 104 has something this user needs to complete a special combination. However, the invention is not limited to this example, and the indication could be applied to anything the user needs from information, to location, to a physical quality.

As another example, and without any limitation, the invention could be applied to on-line dating. If any of the other users having clients are simultaneously visiting the same website also meet the user 104's preferred dating criteria (stored in user preferences 109, for example), such as an unmarried woman between the ages of 25 and 35 that lives in San Francisco, then the invention can let the user 104 know that a woman satisfying this criteria is currently one of the other users visiting the same website by displaying the number 504 in a special color.

Many other examples should become apparent to those skilled in the art after being taught by the present application.

Figure 6:
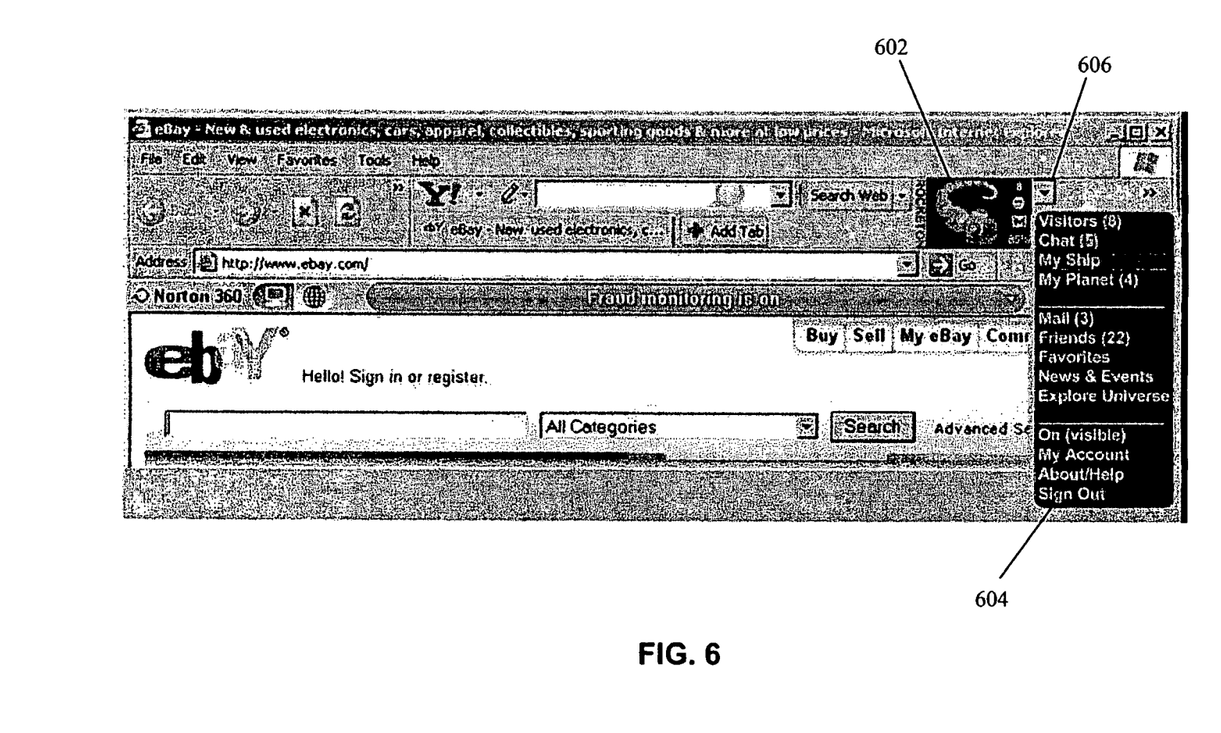

FIG. 6 shows example implementations of other aspects of the invention. As shown in FIG. 6, tray 602 provides a drop-down menu 604, which can be activated when a user clicks on caret 606, for example. As shown in FIG. 6, menu 604 includes numbers in parentheses next to "Visitors" and "Chat". More particularly, according to aspects of the invention, the numbers "8" and "5" are a particular color, such as green. In this embodiment, this color acts as a flag, letting the user know that at least one person simultaneously visiting the same website (e.g. eBay.com in this example) and one person in the chat room, respectively, meets the user's criteria (e.g. having certain Virtual Collectibles 106, sharing certain interests 108, having certain demographics 110, etc.).

Figure 7:
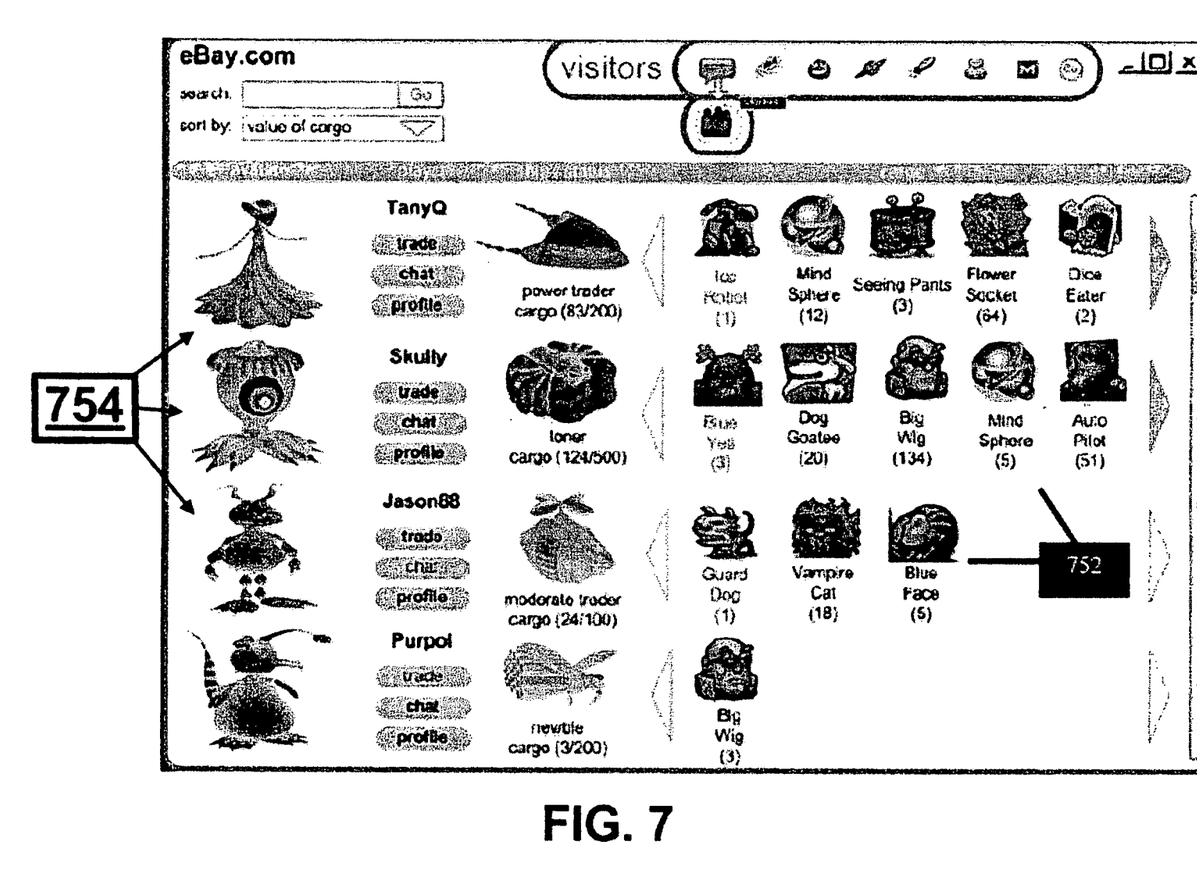

FIG. 7 shows an example implementation of aspects of the invention in connection with a trading system, such as a trading system described in more detail in co-pending application Ser. No. 12/127,476, the contents of which are incorporated herein by reference. In this case, the user needs the "Ice Robot" and "Blue Yeti" to complete a "combo" or other type of game or puzzle hosted by system 100. The trading system provides a way for the user to obtain one or both of these virtual items by trading with other users. Moreover, as shown in FIG. 7, the present invention allows user 104 to view the cargos 752 of other users 754 who are currently simultaneously visiting the same website (e.g. ebay.com in this example). The present invention can further indicate that another user named "TanyQ" currently has an "Ice Robot," and a user named "Skully" has three "Blue Yeti". The "Ice Robot" and "Blue Yeti" are preferably highlighted in a particular color (e.g. green) to indicate that they are virtual goods that the user needs.

Figure 8:
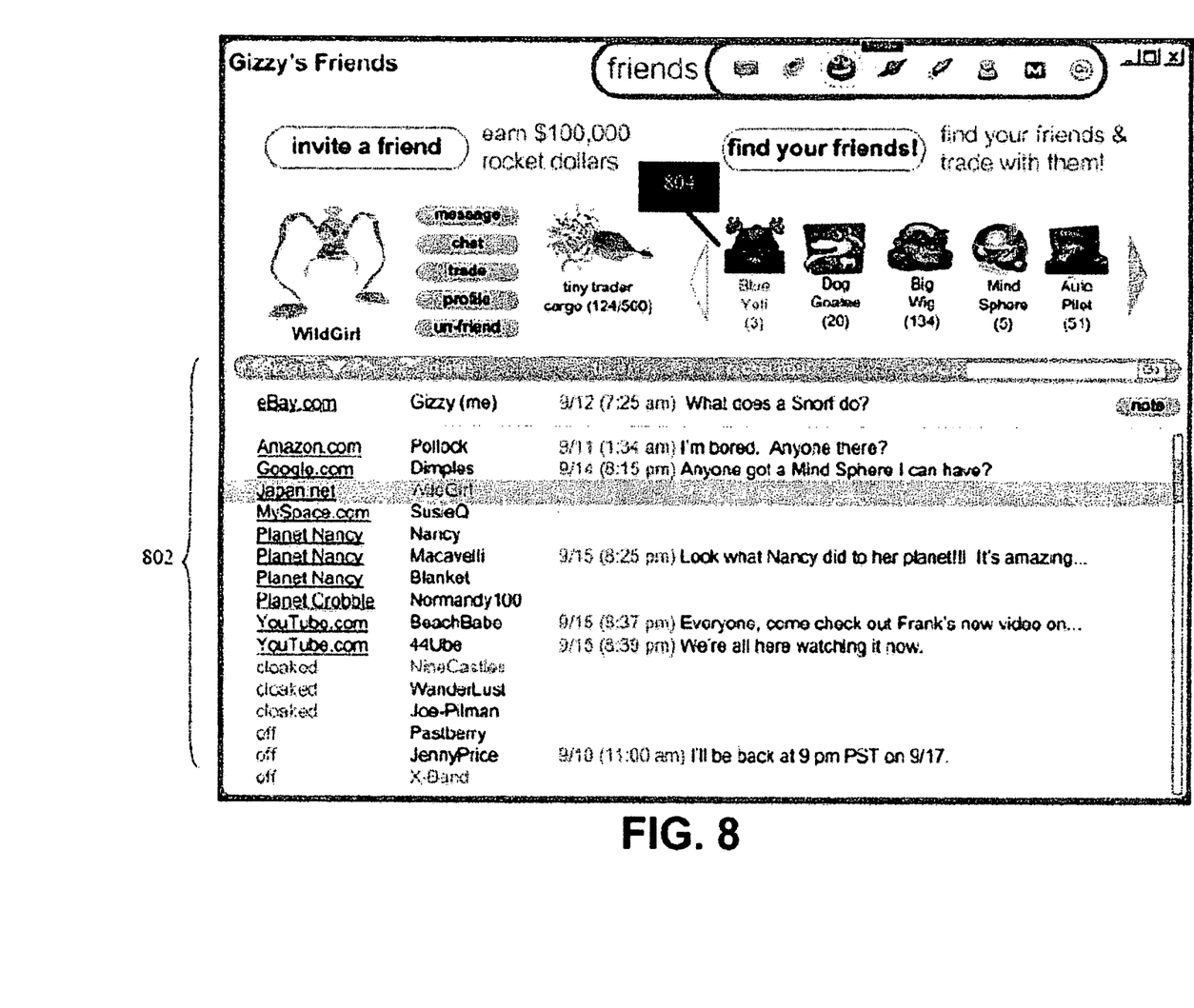

FIG. 8 shows additional example implementations of aspects of the invention. In this case, the system 100 can allow the user 104 to view a list 802 of all his/her friends, and the names of friends who meet the user's particular criteria are shown in a special color. In this example, WildGirl, NineCastles and X-Band are all highlighted in the color green. This indicates that they have something that meets the selection criteria, for example, they all have a "Blue Yeti" virtual good 804 which the user needs to complete a combo or other puzzle, and which is also preferably highlighted in a particular color.

Figure 9:
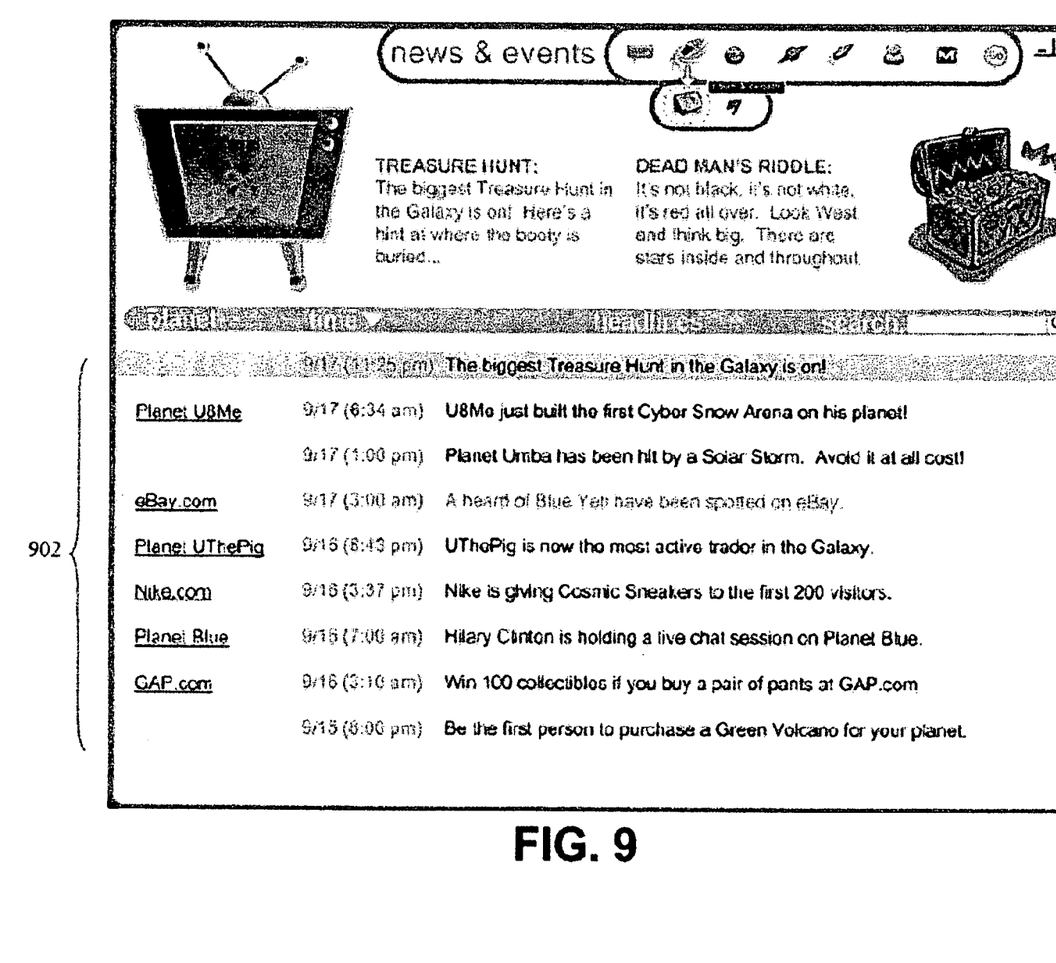

FIG. 9 shows an example implementation of the invention as applied to identifying other users having desired information. As shown in FIG. 9, system 100 can provide a "News and Events" page where the system 100, users 104 and/or partners 102 can post news bulletins 902, in similar manner as conventional social networking applications. In the example shown in FIG. 9, the news and events bulletins 902 includes one that "A heard of Blue Yeti have been spotted on eBay," which can be posted by a partner 102 such as ebay.com. In this example, this bulletin 902 is highlighted in green because "Blue Yeti" meet the user's virtual goods search criteria, and/or is needed to complete a "combo" or other puzzle.

Figure 10:
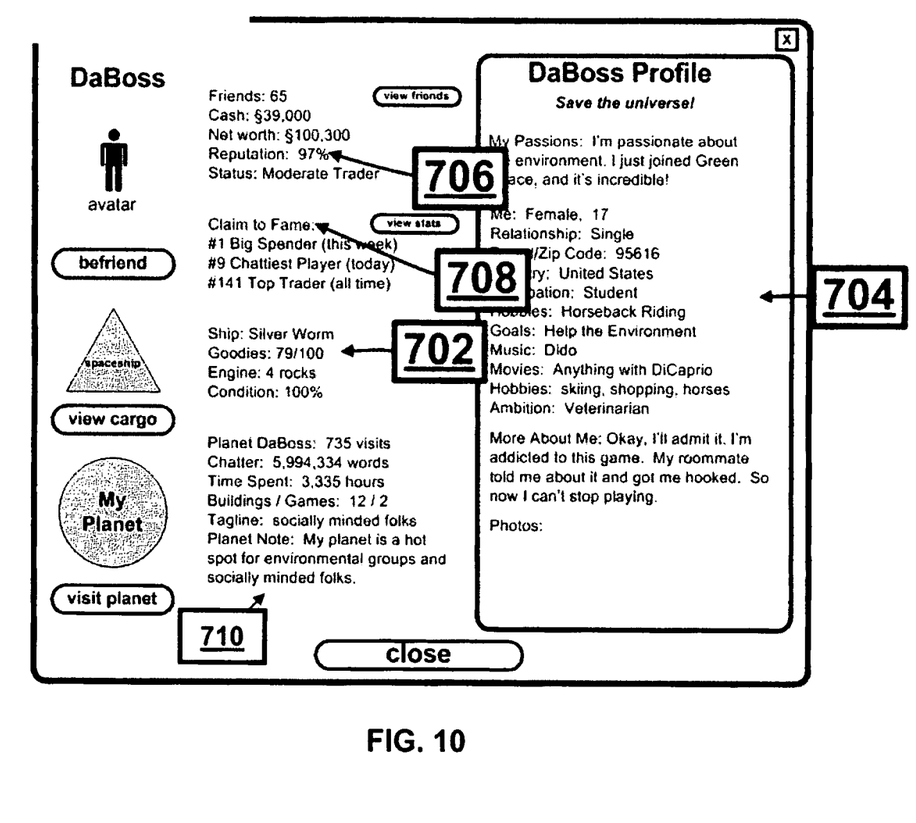

FIG. 10 is a screenshot illustrating an example user profile page that can be generated by system 100 and displayed for a user 104 having a client application. FIG. 10 further illustrates certain user information that can be maintained by system 100 according to aspects of the invention. In particular, the profile page can show user information 704 that can include both user interests 108 and user demographics 110 that can be used by system 100 to promote and facilitate interactions according to aspects of the invention.

As shown in FIG. 10, a user's profile can further include account information 706 indicating the amount of real or virtual funds the user has in his/her account, along with user information such as a user's trading reputation and status (e.g. reputation of 97%, and status as "Moderate Trader"). The profile page can also show a summary of the number and type 702 of Virtual Collectibles 106 the user has.

As further shown in FIG. 10, the user's profile can further include social networking information 710 that includes personal details, the number of visits other users have made to the user's home page or virtual planet, and the amount of activity (e.g. words typed in chat, time spent, etc.) on the user's home page or virtual planet. As further shown, the user's profile page can further include virtual world activity statistics 708. This can include the user's ranking among all system users in a number of categories over a given period of time, for example the money the user has spent for Virtual Collectibles in a given time, the quantity of chat activity, the number of trades, the number of friends made, community/reputation ratings, experience level, etc. It should be apparent that the displayed statistics in a user's profile may only be a subset of the number and types of statistics that can be maintained by the system for each user based on their activity in virtual world(s) hosted by the system.

Figure 11:
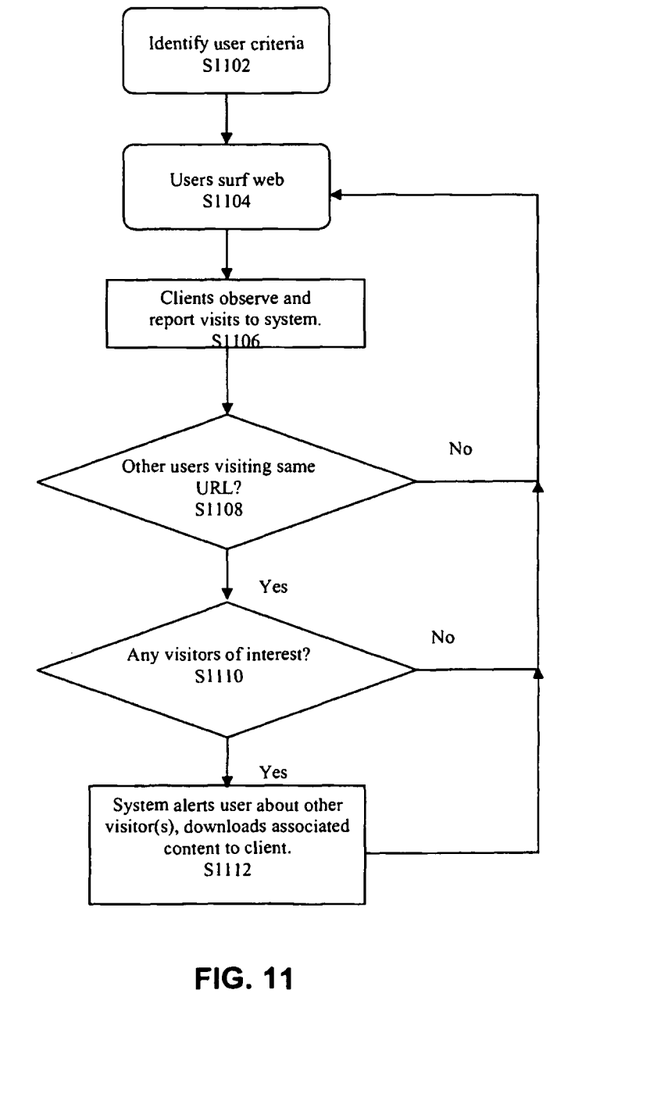
FIG. 11 is a flowchart illustrating an example method for automatically motivating and/or facilitating user interactions in virtual spaces that can be implemented in a system according to aspects of the invention.

FIG. 11 is a flowchart showing an example process that can be implemented by system 100 to promote, motivate and/or facilitate interactions between users.

As shown in FIG. 11, in step S1102, the system identifies criteria for determining which, if any, other users the user 104 may be interested in interacting with. This can be done automatically by the system 100 and/or manually entered into the system 100 by the user. For example, the system 100 can identify previous searches that the user has performed and/or "combos" of Virtual Collectibles 106 that the user is close to competing. It can then compare these to the Virtual Collectibles 106 possessed by the other visitors of the virtual world. As another example, the system 100 can compare user interests 108, user preferences 109 and user demographics 110 entered by the user 104 into system 100 to those of the other visitors to determine if there is a close match. More particularly, system 100 can provide a mechanism (e.g. web page(s), control(s), etc.) that allows user 104 to specify their interests 108 and/or demographics 110 and/or whether they are interested in meeting other users with such interests 108 and/or demographics 110. Those skilled in the art will understand how to implement such mechanisms after being taught by the present disclosure and the co-pending applications.

Next, in step S1104 a user 104 surfs the web as usual. In step S1106, when a user visits a new URL, the user 104's client application notes this activity and transmits this information to system 100. For example, the client can monitor whenever a new URL is typed into the user 104's browser, or when a link to a URL having a different domain name than the current page is clicked. The client may also maintain a memory of the last known URL visited and use that to compare to the new URL. The new URL is transmitted by the client along with other information such as the user's identity, to system 100 using http methods and TCP sockets, for example. It should be appreciated that this communication can take place without the user's awareness.

In step S1108, system 100 compares the URL against the URLs currently/last being visited by all other users 104 that are on-line (e.g. have client applications that are actively communicating with system 100). If there are any other user's currently/last visiting that URL, processing advances to step S1110, otherwise it returns to step S1104.

In step S1110, system 100 further compares the criteria identified in step S1102 with the Virtual Collectibles 106, user interests 108 and/or user demographics 110 of other users visiting the same URL. If system 100 in step S1110 determines that another user(s) meets those criteria, processing advances to step S1112. Otherwise, processing returns to step S1104.

In step S1112, system 100 sends data, text and/or multimedia content to the client associated with user 104 which can correspondingly present a message on the host device's output component, such as a computer screen or a cell phone screen, or provide another indicator (e.g. a tone or buzz) indicating that another user meets criteria that the user 104 might find interesting. For example, the content can cause certain text associated with the user 104's client application to appear and/or change color. Additionally or alternatively, the content can cause an avatar associated with the other user to flash, glow, or change in size. User 104 can then have the option to interact with the other user, including for example, to view the other user's Virtual Collectible by right-clicking on the other user's avatar and viewing the other user's cargo. If a user so chooses, the user can also send a chat message to the other user and/or invite the other user to discuss a trade. The actual processes and mechanisms that are used to enable a user to interact with other users are described in more detail above and in the co-pending applications.

It should be noted that, in some embodiments, the user could be alerted about other users of interest without ever leaving a specific URL. For example, User A might be at www.google.com and chatting away with other users. Then, when another user enters www.google.com, and who meets the criteria that User A has set, an alert can be sent to User A. Similarly, when the User A is in the surfing mode (i.e., the User A has not opened the application to chat or show his/her presence in the form of avatar, but still have the client application turned on), another user may come to the URL where the User A is, and this second user may meet User A's criteria. In that case, system 100 would alert the User A, and prompt the User A to open the client and show his/her presence to initiate interaction with the other user.

It should be further noted that system 100 can include similar functionality as described in the co-pending applications for automatically adding users to chat groups associated with a commonly visited virtual location. For example, depending on the user's preferences, as stored in user accounts for example, system 100 can determine whether or not the user wishes to enter a parallel destination provided by the partner associated with the matching URL, or has turned this feature off. As another example, there may be criteria that configures how and when to allow particular users to receive virtual goods or services, as described in co-pending application Ser. No. 12/118,533.

According to certain aspects of the invention, further entertainment value for users (and as a result, added traffic for the system and partner web sites) can be provided by allowing users to trade Virtual Collectibles with other users, either for entertainment value itself, or to gain prizes according to the terms of a game conducted by the system, for example to obtain Combos.

The example implementations described above should be considered illustrative rather than limiting, and many combinations, divisions, deletions, alterations and supplementations even within the above described implementations are possible, as should become apparent to those skilled in the art. For example, and without limitation, aspects of the invention can be combined in various ways with the functionalities described in the co-pending applications.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, comprising:
hosting, by a server, a virtual world in which users can interact with each other via respective avatars;
allowing a first one of the users to specify criteria associated with one or more virtual goods possessed by a second one of the users for use in the virtual world;
receiving at the server, from a first client associated with the first user, information regarding a URL associated with a publicly accessible website that the first user is visiting via a network;
receiving at the server, from a second client associated with the second user, information regarding the URL associated with the same publicly accessible website that the second user is simultaneously visiting via the network;
automatically by a server, in response to receiving the information from the first and second clients that the first and second users are simultaneously visiting the same publicly accessible website, comparing the criteria with information in a profile of the second user; and
automatically, by the server, alerting the first user about the second user based on information in the profile of the second user matching at least some of the criteria via communications by the server with the first client, wherein the publicly accessible website is separate from the server and its hosted virtual world with respect to network addresses.

2. A method according to claim 1, wherein the automatically alerting step includes:
identifying a plurality of other users simultaneously visiting the same publicly accessible website;
comparing the criteria to user information regarding the other users; and
identifying the second user from among the plurality of users based on a match between the criteria and the second user's user information.

3. A method according to claim 2, further comprising:
sending, from the server, information to the first client regarding a total number of the users visiting the same website; and
rendering on a display associated with the first user, by the first client, content including the total number.

4. A method according to claim 1, wherein the criteria includes a virtual good that the first user is interested in acquiring.

5. A method according to claim 1, wherein the criteria further includes one or more of a personal interest that the first user has, a personal demographic of the first user, and a personal preference regarding other people that the first user has.

6. A method according to claim 1, further comprising:
providing a mechanism by which the first user enters information relating to the criteria.

7. A method according to claim 1, wherein the step of identifying the criteria includes:
automatically determining potential interests of the first user based on user information of the first user; and
automatically forming the criteria based on the automatic determination.

8. A method according to claim 7, wherein the user information includes a predetermined combo of virtual goods that the first user has not yet completed.

9. A method according to claim 7, wherein the user information includes virtual goods that the first user already possesses.

10. A method according to claim 7, wherein the user information includes one or more of activities that the first user is interested in and personal demographic information about the first user.

11. A method according to claim 1, wherein alerting includes displaying a name associated with an avatar of the second user in a list of all other ones of the users who are simultaneously visiting the publicly accessible website.

12. A method according to claim 11, wherein displaying includes displaying the name in a special color.

13. A method comprising:
hosting, by a server system, a virtual world in which users can interact with each other via respective avatars;
allowing a first one of the users to specify criteria associated with one or more virtual goods possessed by a second one of the users for use in the virtual world;
receiving information, at a server system, that the first and second users are simultaneously accessing first and second publicly accessible website addresses, wherein the server system and its hosted virtual world are remotely located with respect to network addresses from the publicly accessible website addresses; and
serving content from the server system to a client associated with the first user that indicates the presence of the second user based on matching information in a profile of the second user with the specified criteria, the server system automatically comparing the profile to the criteria and serving the content in response to receiving the information the first and second users are simultaneously accessing the first and second publicly accessible website addresses,
wherein other users that access the first publicly accessible website address and are not configured with the client do not receive the content served by the server system.

14. A method according to claim 13, further comprising:
identifying, at the server system, other criteria regarding other users that the first user is interested in interacting with; and
identifying, at the server system, a third one of the users based on the criteria.

15. A method according to claim 14, wherein the other criteria includes one or more of a personal interest that the first user has, a personal demographic of the first user and a personal preference regarding other people that the first user has.

16. A method according to claim 13, wherein the criteria includes a virtual good that the first user is interested in acquiring.

* * * * *